United States Patent [19]

Bohnen et al.

[11] Patent Number: 4,703,137

[45] Date of Patent: Oct. 27, 1987

[54] ELECTRIC SWITCHGEAR WITH A PULL-OUT FRAME AND A SWITCHING DEVICE THAT CAN BE INSERTED THEREIN

[75] Inventors: Peter Bohnen; Ludvik Godesa; Reinhard Kugler; Ulrich Marquardt, all of Berlin, Fed. Rep. of Germany

[73] Assignee: Siemens Aktiengesellschaft, Munich, Fed. Rep. of Germany

[21] Appl. No.: 944,377

[22] Filed: Dec. 19, 1986

[30] Foreign Application Priority Data

Dec. 20, 1985 [DE] Fed. Rep. of Germany ....... 3545779
Apr. 8, 1986 [DE] Fed. Rep. of Germany ....... 3612120
Apr. 8, 1986 [DE] Fed. Rep. of Germany ....... 3612118

[51] Int. Cl.$^4$ .............................................. H01H 9/20
[52] U.S. Cl. ................................. 200/50 AA; 361/337
[58] Field of Search ................. 200/50 AA; 361/336, 361/337, 50 A

[56] References Cited

U.S. PATENT DOCUMENTS

| 2,678,976 | 5/1954 | Caswell | 200/50 AA |
| 2,914,635 | 11/1959 | Lester et al. | 337/4 |
| 3,301,984 | 1/1967 | Wilson | 200/153 R |
| 3,560,676 | 2/1971 | Battaglia | 200/50 AA |
| 3,783,209 | 1/1974 | Cleaveland et al. | 200/50 AA |
| 4,002,865 | 1/1977 | Kuhn et al. | 200/50 AA |
| 4,112,269 | 9/1978 | Nelson et al. | 200/50 AA |

FOREIGN PATENT DOCUMENTS

| 00455452 | 2/1982 | European Pat. Off. . |
| 1029070 | 4/1958 | Fed. Rep. of Germany . |
| 3008249 | 4/1984 | Fed. Rep. of Germany . |

Primary Examiner—Roy N. Envall, Jr.
Assistant Examiner—Morris Ginsberg
Attorney, Agent, or Firm—Kenyon & Kenyon

[57] ABSTRACT

A pull-out frame for a switching device with a threaded spindle and a tripping device which can be actuated by a tool provided for actuating the threaded spindle. In the switching device, a coupling member is arranged which transmits the motion of the tripping device of the pull-out frame to a tripping device of the switching meachanism of the switching device. A latching device controlled by the positioning drive makes provision that the tripping device is released only in the course of the travel motion of the switching device for resetting.

19 Claims, 15 Drawing Figures

ELECTRIC SWITCHGEAR WITH A PULL-OUT FRAME AND A SWITCHING DEVICE THAT CAN BE INSERTED THEREIN

BACKGROUND OF THE INVENTION

The present invention relates to electric switchgear having a pull-out frame and a switching device that can be inserted into the pull-out frame. The switching device comprises an actuating device that can be latched and serves for actuating its contact arrangement; the pull-out frame is further equipped with a positioning drive which can be coupled to the switching device and has a threaded spindle for moving the switching device.

Such switchgear has become known, for instance, through U.S. Pat. No. 4,112,269. The pull-out frame and its positioning drive are customarily designed there so that the switching device can assume three positions, namely, an operating position in which connecting leads of the switching device are in engagement with a stationary break contact device; a test position in which the connecting leads of the switching device are pulled out of the break contact arrangement but all auxiliary lines of the switching device are connected to the stationary part of the switchgear; as well as a disconnect position, in which all electrical connections between the switching device and the pull-out frame are interrupted. The transition from the operating position to the test position may pose a considerable danger for the operator and the switchgear if the switching device is closed and a load current is flowing. More or less heavy arcing can then come about between the connecting leads of the switching device and the break contact arrangement. Basically, it presents no difficulties to ensure the tripping of the switching device before its connecting leads are separated from the break contact arrangement by electrical means; for instance, the shifting of the switching device can be determined by a sufficiently sensitive probing switch and be used for actuating a working-current tripping device of the switching device. This, however, assumes that the power supply of the working current tripping device is completely undisturbed and is always ready for operation.

SUMMARY OF THE INVENTION

It is an object of the present invention to provide a mechanical device which acts independently of an auxiliary power supply automatically and ensures that the switching device can be shifted and removed from the switching installation only in a voltage-free condition. In particular, the switchgear must be disconnected when being moved. Furthermore, the energy accumulator which may be provided for switching operation must also be deenergized for removal from the switching installation.

The above and other objects of the present invention are achieved by an electric switchgear having a pull-out frame and a switching device which can be inserted into the pull-out frame wherein the switching device comprises an actuating means for operating a contact apparatus of the switching device, the actuating means having latching means for locking said actuating means, the pull-out frame being provided with a positioning drive adapted to be coupled to the switching means and having a threaded spindle for moving the switching device, a tripping means being arranged on the pull-out frame adapted to be actuated by a tool provided for operating the threaded spindle, a coupling means being arranged on the switching device which cooperates with a tripping device of the latching means of the actuating means and with the tripping means.

Accordingly, the invention provides that at the pull-out frame, a tripping means is arranged which can be operated by the tool provided for actuating the threaded spindle. Furthermore, a coupling means cooperating with a release member of the latching means of the actuating means is arranged at the switching device. The switching device is therefore tripped automatically still prior to any motion of the switching device since the tool serving for operating the threaded spindle first actuates the tripping means. It is advisable to assign to the tripping means a latching means which can be released by the positioning drive for resetting. Then, the tripping means remains in its actuated position until the positioning drive is actuated and the switching device has been moved. As will be demonstrated in the following, this mechanical dependence can be realized by simple and reliable parts.

In order to assure a desired order of operating steps, it is advisable to connect the latching means of the tripping means to the latching means of the switching device in its different positions in such a manner that a blocking member can be tilted into the path of motion of the tripping means by an unlatching slide serving to release the positioning drive. This blocking member can be designed as a leaf spring with a tab arranged at an angle to the shifting direction of the tripping means, where the tripping means is connected to a projection which can be pushed over the tab. In this manner, already existing parts associated with the positioning drive are concurrently used for the purposes of the invention. In detail, this can be accomplished by the following features: the leaf spring is attached to a control lever which is guided by means of a bearing pin in an elongated hole of the bottom plate of the pull-out frame movably in the travel direction of the switching device and tiltably relative thereto; the control lever is linked to a latch which is attached transversly to the travel direction of the switching device, to a cross piece serving as an abutment for the threaded spindle; the latch has a guide pin for engagement with a gate located in the bottom plate; the control lever is linked to an auxiliary lever which comprises a working surface which cooperates with an unlatching slider in the sense of mutual blocking in the actuated condition; and the gate has recesses for different positions of the switching device in the pull-out frame and cams for the automatic resetting of the control lever and the unlocking slide when the switching device is moved. This arrangement has the purpose to release the threaded spindle of the positioning drive for rotation only if the unlatchihg slide is actuated. At the same time, acknowegement switches are operated which signal this state.

The tripping means for the switching device can have a driver which is adapted to the head of the threaded spindle on the operating side and can be acted upon automatically by the tool. Since the driver can be mounted so that it is engaged by the tool earlier than the head of the threaded spindle, the movement of the switching device cannot start before the tripping has taken place.

The tripping means can be designed as a slider arranged parallel to the threaded spindle and can be moved by a guide rod which is guided movably in a straight line in a movable cross piece serving as an abutment of the threaded spindle, and a stationary cross piece forming an abutment of the threaded spindle. Also in connection with the tripping member and its guide rod, parts are therefore used concurrently which are already available as part of the positioning drive.

Due to the relationship of the described parts, a motion cycle is normally obtained, in which the tripping means is pushed into the interior of the pull-out frame, i.e., is moved away from the front edge of the movable cross piece. In particular, in a design with direct action of the tripping device onto the coupling means of the switching device, it may be advantageous, however, to provide a reverse direction of motion. According to a further embodiment of the invention, such a modified motion cycle can be obtained by the provision that the tripping means of the pull-out frame has a cam which a post of a pressure piece pivoted at the movable cross piece engages, and that a projection of the pressure piece is arranged opposite a working surface of an auxiliary tripping means which is arranged parallel to the tripping means and is guided movably in such a manner that a shift of the tripping means is transformed into a motion of the auxiliary tripping means in the opposite direction. The cam can be designed as a slot approximately shaped as a quarter-circle. Thereby, a relatively large shift of the auxiliary tripping means is obtained with a relatively small shift of the tripping means. Thereby, a reliable actuation of a tripping means of the switching device is achieved.

By similar cooperation of the switching device with the positioning drive, it can also be achieved that the switching device, when being removed from the pull-out frame, can get into the hands of the operator only in a completely released condition. This is achieved by the provision that an energy accumulator serving for closing the contact arrangement of the switching device is automatically released if the switching device is removed from the pull-out frame. For this purpose, parts may be provided which correspond logically to the already described parts. In particular, the switching device can comprise a coupling means which cooperates with a latching means of the energy accumulator and is held in a nonoperative position by means of a sensing member and a sensing surface located at the positioning drive if the switching device is coupled to the positioning drive. The end face of the cross piece of the positioning drive serving as the movable abutment can serve as the sensing surface.

Further embodiments of the invention relate to the transmission of the tripping motion to the tripping members at the switching device itself. To this end, the coupling means can be designed as a longitudinally movable rod which can be driven by a reversing drive (sensing, lever, levers, shaft) which is arranged at the socket (cross piece) of the switching device and cooperates with the tripping means, and which engages a slide with a region of variable width between a stationary guide pin which can be operated in the direction toward the tripping means of the switching device and can be selectably operated by hand, and a pin arranged at the slide. The rod provided with a region of variable width acts on the slide like a wedge. By a suitable choice of the wedge angle, a good transmission characteristic can be obtained, as tests have shown.

Through the deflection drive, the requirement can be met that the tripping process should take place in the course of a relatively slight shift of the switching device in the switching installation or in the pull-out carrier or, if the switching device is stationary, a short actuating stroke should be sufficient.

It may further be of advantage to design the region of variable widths of the rod with mirror symmetry to a center line extending transversely to the length of the rod. In this manner, the possibility is provided to actuate the slide by a thrust motion or also by a pulling motion of the rod.

It is advisable to provide a spring for pretensioning the rod in the direction of displacing the slide in the "off" sense as well as a sensing lever, by which the rod can be moved against the spring force. The sensing lever can be mounted as a part of the mentioned deflection drive in such a manner that, when the switching device is inserted into the switching installation or the pull-out carrier strikes a stationary part, the tilting caused thereby moves the rod while at the same time cocking the spring. Thereby, the release force acting on the release member is cancelled and the switching device can be set in operation.

The described arrangement is equally well suited for actuating the tripping shaft of a switching mechanism of the switching device or for actuating the tripping shaft of an actuating device of the switching device. In this manner it is possible very largely to avoid danger to the user when removing the switching device from its pull-out carrier by the provision that the switching contacts of the switching device are opened and the spring accumulator provided for actuating the switching contacts is released. The same slides can be provided for both tripping processes. In addition, two rods joined flexibly to each other may be provided which are jointly loaded by the restoring force.

The described arrangement can be accommodated naturally in the mechanism of a switching device, for instance, at a wall in which a tripping shaft is supported. In particular, a carrier may be provided for guiding the slide which at the same time forms the abutment of a restoring spring engaging the slide and which has at least one opening for fastening to or in the switching device, for if this embodiment is chosen, a switching device can readily be equipped with the arrangement if required, because the carrier with the slide and possibly also the rods, can form a pre-assembled subassembly which can be inserted with a few manual operations at a point of the switching device provided therefor.

BRIEF DESCRIPTION OF THE DRAWINGS

The invention will be explained in greater detail in the following detailed description with reference to the drawings, in which:

Generally, FIGS. 1 to 5 relate to parts arranged at a pull-out frame, while FIGS. 6 to 15 show parts which are arranged at a switching device and cooperate with parts according to FIGS. 1 to 5;

DETAILED DESCRIPTION

Figure 1:
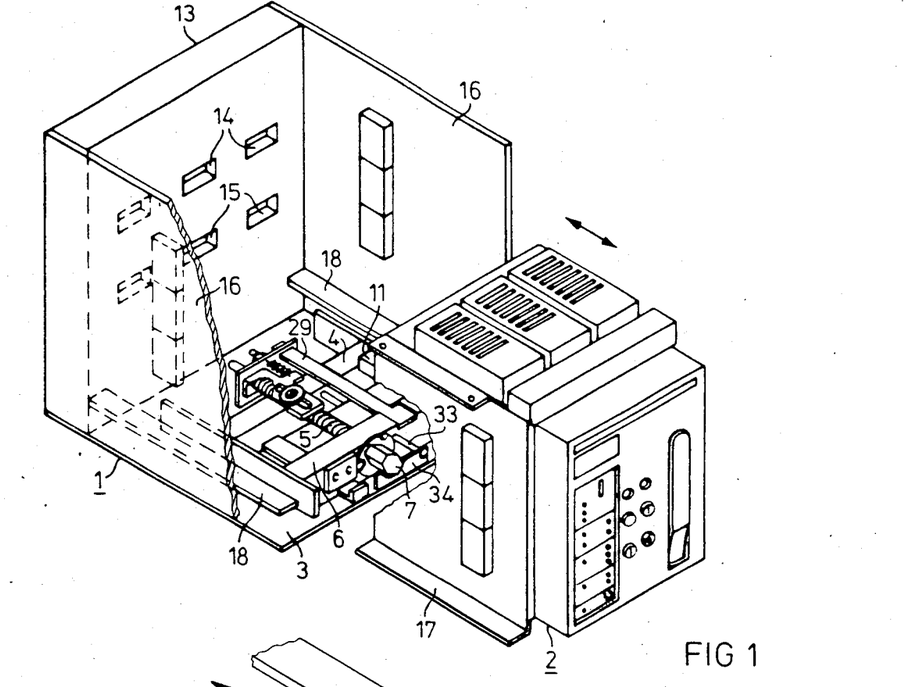
FIG. 1 shows in a schematic perspective view a pull-out frame with a positioning drive and a switching device shown removed from the pull-out frame.

The pull-out frame 1 shown in FIG. 1 is provided for installation in a switching system and serves for accommodating a switching device combination. In FIG. 1, an exemplary low-voltage circuit breaker 2 is shown. The latter can be inserted into the pull-out frame 1 and thereby engages with a positioning drive, the essential components of which comprise a threaded spindle 5, a stationary cross piece 4 designed as the nut for the threaded spindle as well as a movable cross piece 6 which serves as an abutment of the threaded spindle 5 and can be moved by rotation of the threaded spindle. These parts are arranged on a bottom plate 3 of the pull-out frame 1. As an example of guiding parts, support rails 18 are shown in FIG. 1 which are attached to side walls 16 of the pull-out frame 1. On these support rails slides the circuit breaker 2 with base strips 1. The circuit breaker 2 has three poles and connecting leads arranged at the back of which an upper connecting lead 11 is visible. The connecting leads are provided for engagement with a break contact arrangement 13 of the pull-out frame 1 on the back side, which are provided for protection against body contact with voltage-carrying parts with a protective plate and openings 14 and 15 arranged therein. The upper openings 14 are associated with the connecting leads 11, while the lower openings 15 are provided for the lower connecting lead, not visible in FIG. 1, of the circuit breaker 2.

Figure 2:
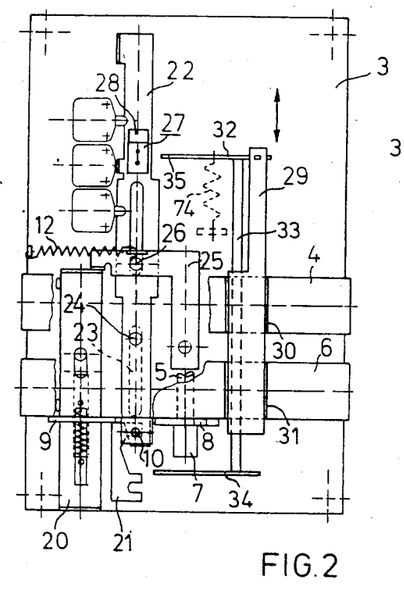
FIGS. 2 and 3 show, in a top view onto the bottom plate of the pull out frame according to FIG. 1, parts of a positioning drive as well as devices for locking the switching device in different positions and for the forced release when the switching device is moved.
Figure 3:
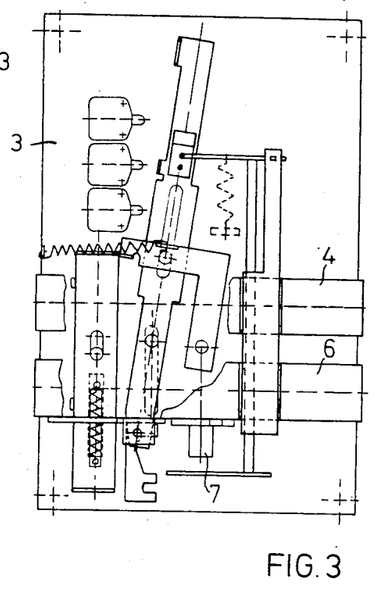

The positioning drive for the circuit breaker 2 is provided with a device for locking in an operating position, a test position, and an "off" position. Details of this device are shown in FIGS. 2 and 3. In the base portion of the positioning drive, a latch 9 engages a recess of a slotted cam 8 which is mounted at the head 7 of the threaded spindle.

The threaded spindle 5 is thereby blocked against rotation. If the rotation is to be released, an unlatching slide 20 must be actuated first, which is guided on the base plate 3. In the base position, an auxiliary lever 25 rests against the rearward working surface of the unlatching slide 20; this auxiliary lever 25 is held tiltably at the base plate 3 and engages with a bearing pin 26 in an elongated hole of a control lever 22. The control lever 22 is in turn guided by means of a bearing pin 24 in an elongated hole 23 of the base plate 3 and can thereby be shifted in the travel direction of the switching device as well as also relatively thereto. Such tilting comes about if the unlocking slide 20 is actuated (FIG. 3) and thereby, the auxiliary lever 25 slides off the rear working surface of the unlocking slide 20 and rests laterally against the unlatching slide. This position is at first maintained under the influence of a restoring spring 12 engaging the auxiliary lever. The tilting of the control lever 22 is transformed by an articulated connection by means of a guide pin 10 attached to the latch 9 into a shifting of the latch, the projection of which is thereby lifted out of the slot cam 8. The threaded spindle 5 can now be rotated by placing a suitable tool on the head piece 7.

The further operations are controlled by gate 21 which is located in the bottom plate 3. The gate has three recesses, the spacings of which correspond to the path to be traveled of the circuit breaker 2 between the operating position and the test position as well as between the test position and the "off" position. Between the recesses are located cams which are sensed by the guide pin of the latch 9. In this manner, the deflection of the control lever 22 is respectively enlarged over the tilted position (FIG. 3) so far that, by taking along the auxiliary lever 25 via the bearing pin 26, the mutual blocking between the auxiliary lever and the unlatching slide 20 is cancelled and the latter can return to its starting position (FIG. 2). Thereby, the control lever 22 can likewise return to its starting position (FIG. 2), if due to the snifting of the cross piece 6 by means of the threaded spindle 5 the guide pin 10 of the latch 9 gets into the next recess of the gate 21. Due to the engagement of the latch 9 with the slot cam 8, the rotation of the threaded spindle 5 is then blocked again.

The control lever 22 has an extension on the back side with the striking surfaces for schematically indicated auxiliary switches which are assigned to the mentioned three positions of the positioning drive and therefore, of the circuit breaker 2. To this rearward extension is further attached a leaf spring 27 with an angled off tab 28, the significance of which will be explained later on.

The circuit breaker 2 contains in a manner known per se contact members for each pole which are designated in the following together as the contact apparatus. An energy accumulator is further provided for actuating the contact apparatus, for instance, in the form of springs. By cocking the energy accumulator, the circuit breaker is made ready for closing. By a latching member, the cocked position of the energy accumulator can be maintained until it is released by remote control or by hand. The contact apparatus is then actuated via an actuating device called the switching mechanism and is kept in the closed position by a latching member. The energy required for opening is stored in the contact apparatus itself. If therefore the latching member of the switching mechanism is released, the separation of the contacts of the contact apparatus takes place immediately. Since this mode of operation of circuit breakers, particularly of low-voltage circuit breakers, is in common use, a detailed description is dispensed with; details are shown, for instance, in U.S. Pat. No. 3,301,984.

In order to ensure that the circuit breaker 2 is switched off if its position within the pull-out frame 1 is changed, a tripping slide 29 is provided as the tripping member for the circuit breaker in the pull-out frame 1. The tripping slide 29 is guided in a slot 30 of the cross piece 4 as well as in a further slot 31 of the cross piece 6. At its inner end, the tripping slide 29 is connected by a cross piece 32 to a guide rod 33 which is likewise guided movably in the cross pieces 4 and 6. As is especially shown in FIG. 4, the tripping slide 29 and the guide rod 33 are arranged parallel to the threaded spindle 5. At the front end, the guide rod 33 carries a driver 34 which has a recess fitting the profile of the head 7 of the threaded spindle 5 with appropriate play. In its base position, the driver 34 is located in front of the end of the head piece 7. If the threaded spindle is to be actuated, the tool provided for turning automatically first strikes the driver 34 which consequently must be moved before the tool can come into engagement with the head 7. Thereby, the guide rod 33 and the slide 29 are shifted in the direction of the interior of the pull-out frame 1. Since the threaded spindle can be turned only if the unlatching slide 20 has been actuated first, the control lever occupies the tilted position shown in FIG. 3, in which the leaf spring 27 with its tab 28 is in the path of motion of a projection 35 formed by the cross piece at the end of the guide rod 33. If the guide rod 33 is moved, the projection 35 is thus pushed over the tab 28 of the leaf spring 27, and the guide rod 33 as well as the slide 29 are held in this position as long as the control level 22 occupies the position shown.

The cross piece 6 of the positioning drive changes its position relative to the cross piece 4 if the switchgear is moved by means of the threaded spindle 5. In the process, however, the guide rod 33 and the tripping slide 29 are made to follow by an arrangement shown in FIG. 4. The latter comprises a follower slide 36 which is guided movably in the longitudinal direction of the threaded spindle 5 by means of an elongated hole 37 on the top side of the cross piece 4. At its rear end, the follower slide 36 has an angled-off portion 40 which extends with an opening over the threadless end piece 41 of the threaded spindle 5. Provision is made by a cotter pin going through the end piece 41, a setting ring or similar means that the threaded spindle can rotate unimpeded and that the follower slide 36 is taken along in both directions of motion. The cross piece 32 is held here by a tension spring 42 in contact with the angled-off portion 40 or a part located between the cross piece 32 and the angled-off portion 40 and is likewise taken along thereby. To this end, the tension spring 42 is arranged between a lateral extension 43 of the follower slide 36 and the cross piece 32.

Figure 4:
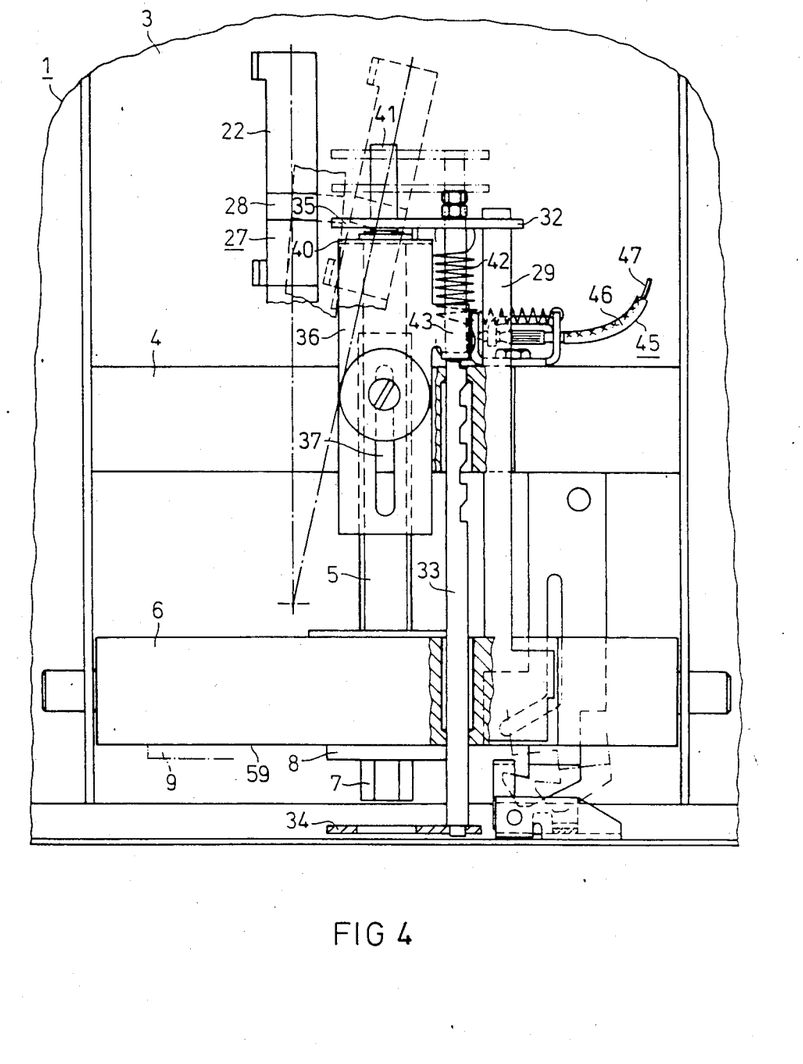
FIG. 4 explains the slaving of a tripping slide which shows a top view onto parts of the positioning drive.

As is shown in FIG. 4, the angled-off portion 40 of the follower slide 36 is parallel to the part of the cross piece 32 connected to the guide rod 33. By introducing a force between the angled-off portion and the cross piece, it is therefore possible to move the guide rod 33 and thereby the tripping slide 29 in the direction of tripping also without action on the driver. As an example of the introduction of such a force, FIG. 4 shows a flexible transmission member 45 which may be a wire tripping device (Bowden cable). The jacket 46 of the transmission member 45, provided with, a section of thread in a manner known per se, is screwed into a corresponding opening of the cross piece 32, while the core 47 rests with a plunger against the angled-off portion of the follower slide 36. By actuating the transmission-member 45, the switching mechanism of the switchgear can thus also be tripped. With this further embodiment of the invention it is possible with a distinctly small amount of techanical means to bring about a forced dependence on one or more conditions in a switching installation. To this end, also two or more transmission members 45 can accordingly be inserted into openings of the cross piece 32 provided for this purpose. As an example for a desired dependence, the case will be mentioned that only one of two circuit breakers connected to a common bus bar can be switched on.

Figure 5:
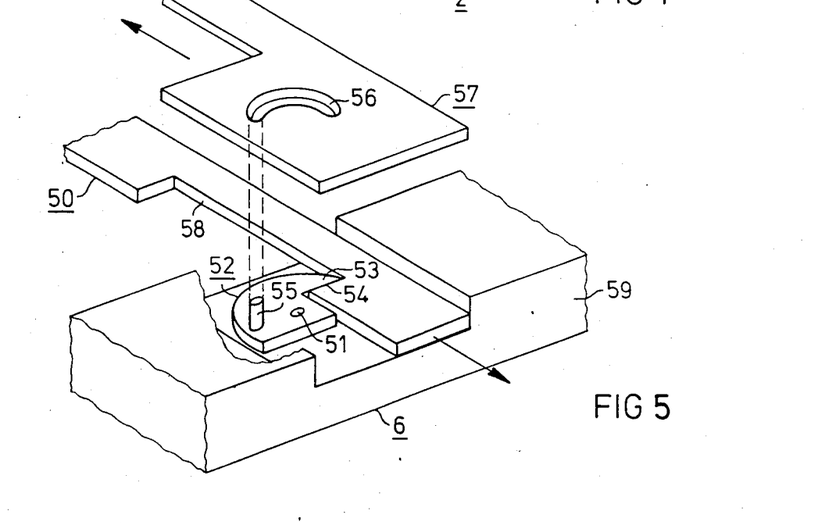
FIG. 5 shows in a perspective view an arrangement for reversing the direction of motion of a tripping member.

A tripping member of the switchgear can be actuated by the tripping slide 29. More advantageous is the use of an auxiliary tripping slide 50 according to FIG. 5 because the latter executes a forward motion which can be transmitted to the switchgear in a particularly simple manner. As shown, a pressure piece 52 is rotatably supported in a recess on the top side of the movable cross piece 6 by means of a pivot 51. A projection 53 of the pressure piece 52 cooperates with a working surface 54 of an auxiliary tripping slide 50 which is likewise guided movably in the recess of the cross piece 6. A driver pin 55 of the pressure piece 52 is provided for engagement with a control slot 56 approximately in the shape of a quarter circle, of a tripping slide 57, the position and actuation of which corresponds to the tripping slide 29 in FIG. 4. In FIG. 5 the parts are shown in an exploded view merely for better understanding. In the assembled condition, the tripping slide 57 is situated directly over the auxiliary tripping slide 50, where the depth of the recess of the movable cross piece 6 corresponds to at least the material thickness of both slides.

If the tripping slide 57 is moved in the direction of the arrow shown in FIG. 5, the pressure piece 52 is swung via the driver pin 55 about its pivot 51 in such a manner that the projection 53 acts on the working surface 54 of the auxiliary tripping slide 50 and shifts the latter in the direction of the arrow, i.e., forward. By a suitable design of a recess 58 of the auxiliary tripping slide 50, the front edge of which forms the working surface 54, provision is made for sufficient motion clearance of the auxiliary tripping slide. The motion characteristic can be influenced by the form of the control slot 56; in the example shown, the control slot 56 has approximately the shape of a quarter-circle, whereby initially a small displacement of the tripping slide 57 is transformed into a relatively large displacement of the auxiliary tripping slide 50. In the further course of the displacement, the conditions are reversed in such a way that a relatively large displacement of the tripping slide 57 is followed by a relatively small displacement of the auxiliary tripping slide 50. It is achieved thereby that a transmission member which is mounted at the corresponding switchgear and cooperates with the auxiliary tripping slide 50 is acted upon almost in step-fashion and reliable tripping is brought about.

In the following, embodiments of coupling members are explained by reference to FIGS. 6 to 15, which serve for transmitting the tripping motion of the tripping slide 29 or the auxiliary tripping slide 50 to the circuit breaker 2.

Figure 6:
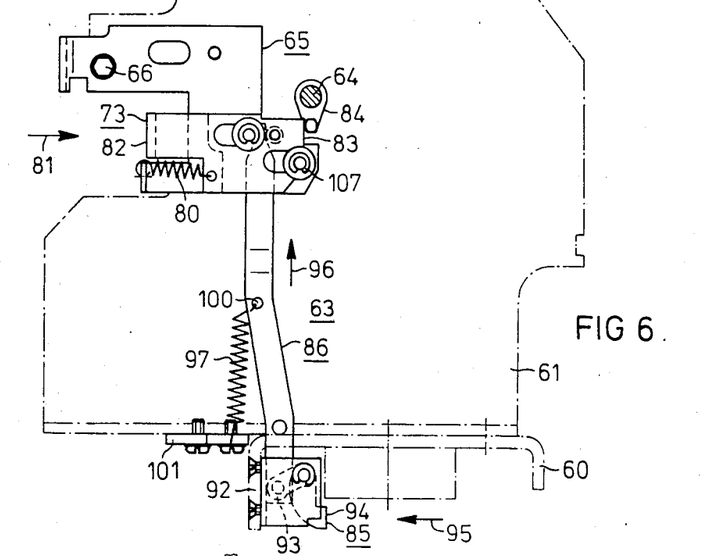
FIGS. 6 and 7 show an arrangement for tripping the switching mechanism of a low-voltage circuit breaker in two orthogonal views.
Figures 7, 14:
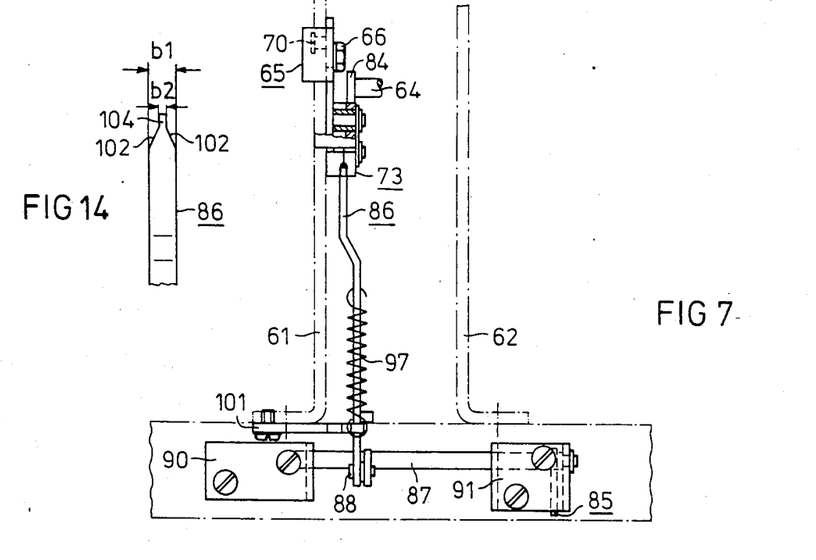
FIGS. 14 and 15 show regions of variable width at rods of different design.

A cross beam 60 with U-shaped cross section indicated in FIGS. 6 and 7 by dashed-dotted lines as well as walls 61 and 62 which are arranged perpendicularly thereto and are connected to it are part of the support mechanism of the low voltage circuit breaker 2 shown in FIG. 1. The walls 61 and 62 may preferably be partitions in which drive shafts as well as tripping shafts of the switching mechanism are supported. The arrangement which is mounted at the cross beam 60 together with the walls 61 and 62 are designated as a whole with 63 and serves for actuating a tripping shaft 64 of the switching mechanism of the circuit breaker.

All other parts of the circuit breaker are not shown since they are not required for an understanding of the invention and the arrangement 63 can be employed for circuit breakers of different designs. An example for a low-voltage circuit breaker is shown in U.S. Pat. No. 3,301,984.

Figure 10:
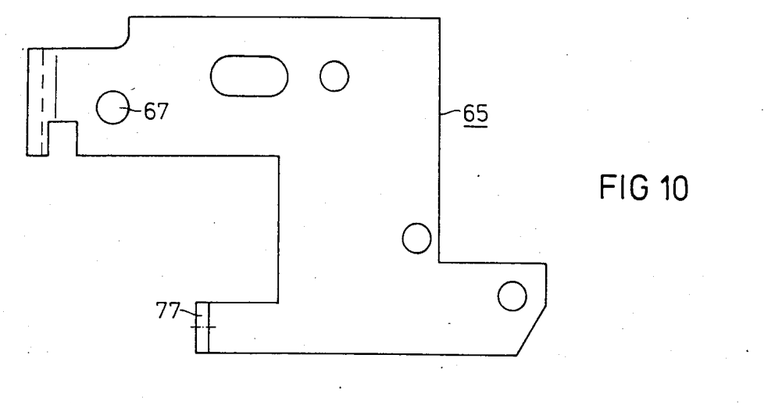
FIGS. 10 and 11 show, in two orthogonal, partially sectionalized views, a carrier for a movably guided slide in a view enlarged relative to FIGS. 6 and 7.

The arrangement 63 comprises a support 65 which is fastened to the wall 61 by means of a screw 66. As is shown in FIGS. 6, 7 and 10, the support 65 has a through hole 67 for receiving the mounting screw 66. The support 65 is further provided with a mushroom-like bolt 70 which can be inserted, for facilitating the fastening of the support 65 to the wall 61, into a corresponding opening, for instance, an opening in the form of a keyhole. On the opposite side, the support 65 has two guide pins 71 and 72 which serve for guiding the slide 73, as shown in FIG. 6. To this end, the slide 73 is provided with an elongated hole 74 as well as with a further elongated hole 75 open to one side. A tension coil spring 80 which exerts a restoring force on the slide 73 is stretched between an opening 76 of the slide 73 and an angled-off leg 77 of the support 65.

The slide 73 can thereby be moved through action by an actuating force in the direction of an arrow 81 shown in FIG. 6. The actuating force can act for this purpose in a suitable manner on a working surface 82 of the slide 73, for instance, directly by hand or by means of a push-button which can be operated manually and is mounted to a front panel forming the termination of a circuit breaker on the operating side.

With a further working surface 83, opposite the working surface 82, the slide 73 rests against a crank arm 84 which is mounted on the tripping shaft 64 of the switching mechanism of the circuit breaker 2. Thus, the switching mechanism can be tripped at any time as desired by actuating the slide 73 in the direction of the arrow 81 (FIG. 6).

So that the circuit breaker can be tripped also in a forced manner in dependence on operating parameters, a sensing lever 85 which can likewise shift the slide 73 by means of a rod 86 is pivoted on the inside of the cross beam 60. To this end the sensing lever 85 is fastened on the shaft 87 which is rotatably supported at its ends in pillow blocks 90 and 91. These pillow blocks are fastened by screws to the leg 92 of the cross beam 60 on the front side. As is shown in FIG. 6, the sensing lever 85, together with a lever 93 mounted on the shaft 87 forms an angle lever in such an arrangement that action on a sensing surface 94 of the sensing lever 85 can be moved with a force acting in the direction of an arrow 95 shown in FIG. 6, in the direction of an arrow 96, i.e., substantially at right angles to the direction of the force (arrow 95). A coil tension spring 97 is hung in an opening 100 of the rod 86 and engages with its opposite end an abutment 101 lying in the plane of the cross beam 60. The end of the rod 86 opposite the sensing lever 85 has a region of variable width, the shape of which is shown particularly from FIG. 14. As shown, the width of the rod 86 decreases in this region, starting from a dimension b1 to a smaller dimension b2. The transition is made by symmetrical inclined surfaces 102 which can be of straight or curved design.

In the base position shown in FIG. 6, the rod 86 engages with its upper end part a recess 103 of the slide 73. The one side of the post 104 remaining at the upper end of the rod 86 rests against the guide pin 71, while the other side of the post 104 rests against a pin 105 of the slide 73 which is provided with a roller 106 for reducing friction. In the position of the parts according to FIGS. 6 and 7, the open side of the recess 103 of the slide 73 faces the support 65. The slide 73 is secured against removal by spring rings 107 which are inserted into a slot at the end of the guide pins 71 and 72. The surfaces 108 and 109 of the slide 73, adjoining the open side of the recess 103 are offset against each other by the material thickness of the support 65 in such a manner that the surface 108 rests on the support 65 and the surface 109 comes to rest on the wall 61 laterally of the support 65. An angled-off portion adjoining the surface 108, which has the working surface 82, extends over the end faces of the carrier 65 and the wall 61. Thereby, a sufficient area for introducing a force by a manual operating member is available in such a position that the slide 73 can be shifted without jamming.

If, starting from this position, the rod 86 is moved by operating the sensing lever 85 in the direction of the arrow 96, the inclined surfaces 102 are urged in wedge-fashion between the guide pin 71 as a roller 106, whereby the slide is displaced in the direction of the arrow 81 so far as corresponds to the difference of the dimensions b1 and b2.

By an articulated connection of the rod 86 to the lever 93 by a pin 88, provision is made that the slide 73 can be moved by the rod 86 without impediment.

As is shown particularly in FIGS. 6 and 7, the entire arrangement 63 shown can be used if it is desired that the tripping shaft 64 can be influenced not only by hand but additionally also automatically. In a basic design of the circuit breaker 2, only a manual actuating member is thus required to act on the crank arm 84 of the tripping shaft 64. For the purpose of automatic tripping, the described arrangement can be inserted with only a few manual operations into the mechanism of the circuit breaker 2 by fastening the carrier 65 with the slide 73 to the wall 61. The pillow blocks 90 and 91 can form, with the shaft 87 and the rod 86, a further subassembly which is likewise easy to attach. It is further possible to attach the slide 73 without a separate support 65 directly at the wall 61 by fastening the guide pins 71 and 72 (FIG. 11) on the wall 61 instead of the beam 65. The slide 73 then belongs to the basic design of the circuit breaker with the result that the manual operating member for rotating the tripping shaft 64 is the same for both designs of the circuit breaker and that only the rod 86 with the associated parts needs to be retrofitted as a coupling member if required. The sensing lever 85 is acted upon by the auxiliary tripping slide 50 at the pull-out frame 1. For each shifting of the circuit breaker 2 in its pull-out frame, the auxiliary tripping slide 50 is pushed in the described manner against the sensing lever 85 and held in this position until the shifting process is terminated. It is therefore not possible to reclose the circuit breaker during the movement.

Figures 8, 9, 15:
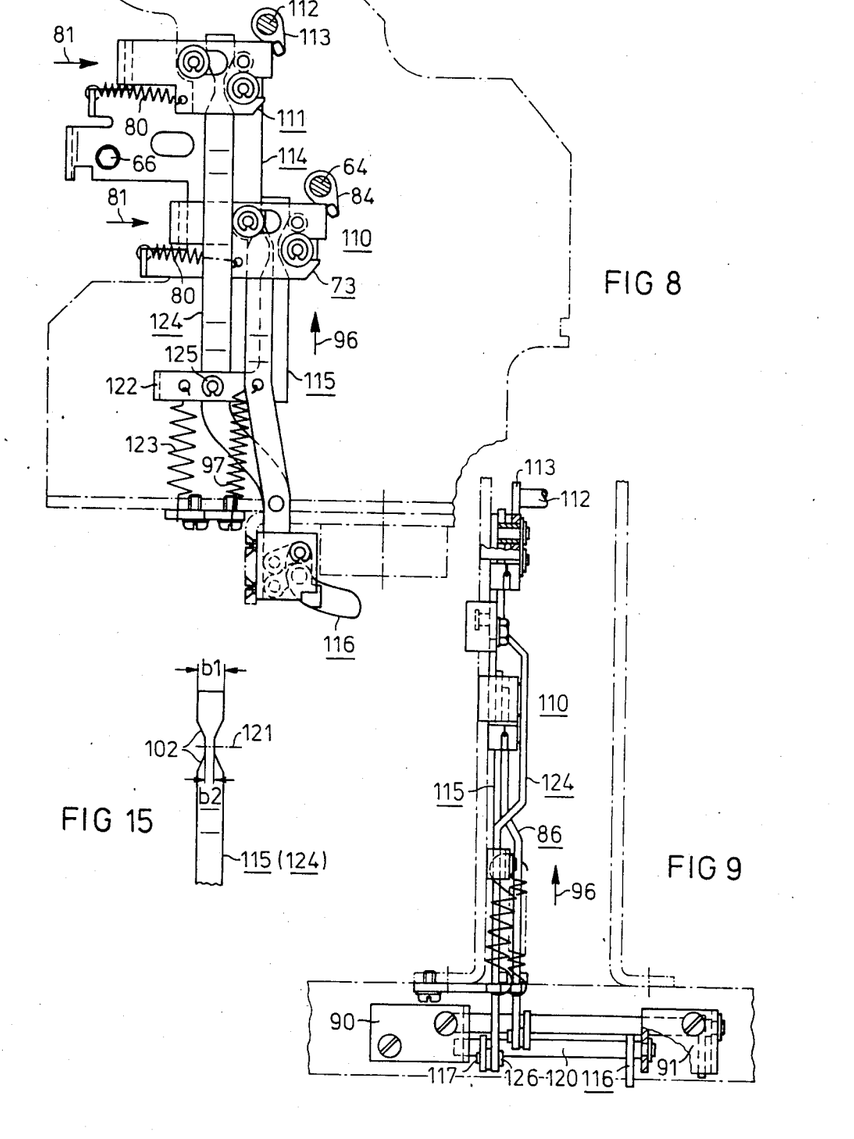
FIGS. 8 and 9 show an arrangement corresponding to FIGS. 6 and 7, which additionally allows releasing the closing energy accumulator of a low-voltage circuit breaker.

In the further embodiment according to FIGS. 8 and 9, a further arrangement 110 is provided which comprises in addition to the already described slide 73, a further identical slide 111. The further slide 111 actuates a tripping shaft 112 which is part of an accumulator drive serving the circuit breaker on. By actuating the tripping shaft 64 as well as the tripping shaft 112, it can be achieved thereby that all spring accumulators of the circuit breaker are released and the operating personnel is protected against suprising and dangerous motion operations when handling the circuit breaker.

Figure 11:
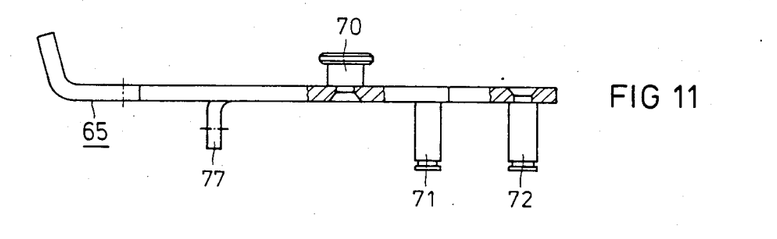
Figure 12:
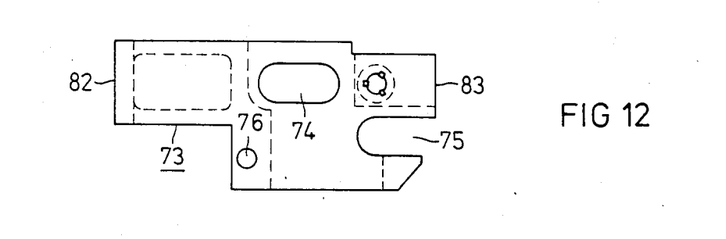
FIGS. 12 and 13 show, likewise in a view enlarged relative to FIGS. 6 and 7, a slide in two orthogonal views.
Figure 13:
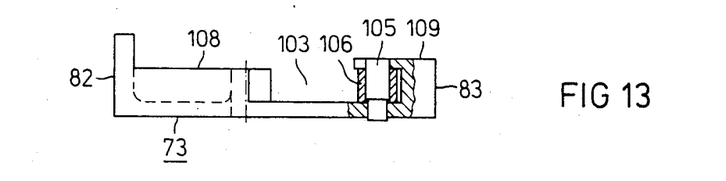

The further slide 111 is guided together with the slide 73 on a support 114 in the same manner as was described for the slide 73, making reference to FIGS. 6 and 11. To this end, the carrier 114 is made enlarged over the carrier 65 shown in FIGS. 10 and 11 but can be fastened by means of a screw 66 to the wall 61 of the circuit breaker. Likewise in agreement with FIGS. 6 and 7, the rod 86 is arranged in the described manner for moving the slide 73. The recess 103 (FIG. 13) of the slide 73 which is made sufficiently wide, however, engages, in a position parallel to the rod 86, a further rod 115 which can be shifted by means of a further sensing lever 116, a lever 117 and a shaft 120 supported in the pillow blocks 90 and 91 can be moved in the direction of the arrow 96. The end of the rod 115 cooperating with the slide 73 is shown as a detail in FIG. 15. As shown, the region of variable width at the end of the rod 115 is designed symmetrically to a center line 121 extending transversely to the longitudinal axis of the rod 115.

The end of the rod 115 is designed symmetrically to a center line 121 extending transversely to the longitudinal axis of the rod 115. Accordingly, the width of the rod 115 decreases from the dimension b1 initially to the dimension b2 and then decreases, starting from the dimension b1 first to the dimension b2 and then increases again to the dimension b1, regardless of the direction of view. Obviously, this design of the rod 115 provides the possibility to cause a shift of the slide 72 by shifting the rod 115 in the direction of the arrow 96 as well as against this direction. In the embodiment according to FIGS. 8 and 9, the arrangement is made so that the slide 73 is shifted in the rest condition in the direction of the rotation of the tripping shaft 64 by action of the rod 115 by means of a coil tension spring 123. Only by actuating the further sensing lever 116 is the rod 115 lifted and then gets with its narrow part between the guide pin 71 and the roll 106, so that then, the slide gets into the position shown in FIG. 6 under the influence of the coil tension spring 80.

By a one-sided engagement of the coil tension spring 97 at the rod 86, provision is made that the rod 86 always rests with its inclined surface 102 against the guide pin 71 without disturbing play.

For actuating the further slide 111, a further rod 124 is provided as the coupling member, which is designed at its upper end in the same way as is shown for the rod 115 in FIG. 15. The rods 115 and 124 are flexibly connected to each other by means of a joint pin 125. To this end, the rod 115 has an annular shape, the joint pin 125 going through the angled-off leg 126 in the rod 115. The coil tension spring 123 also engages leg 126 which thus pretensions both rods in the direction of moving the slides 73 and 111 in the direction of the arrow 81. The tripping shafts 64 and 112 are thereby rotated in the direction of tripping. It is the purpose of this arrangement to place the circuit breaker, of which the arrangement 110 is part, into a completely released state if the circuit breaker is removed from the switchboard cabinet or its pull-out frame 1. To this end the sensing lever 116 is arranged so that when it is being inserted, it makes contact with a stationary counterpiece and thereby, the rods 115 and 125 are shifted in the direction of the arrows 96 while at the same time cocking the coil spring 123. The movable cross piece 6 of the pull-out frame 1 is suited particularly as the counterpiece; see FIGS. 1 and 4. The slides 73 and 111 consequently arrive at the position shifted against the direction of the arrow 81, whereby the tripping shafts 64 and 112 return to their rest position. Starting from this, the closing accumulator of the circuit breaker can be cocked and the switch contacts closed.

As was already mentioned with respect to the slide 73 and the rod 86, also the mobility of the slide 111 is not impeded by the rod 114 because the latter is connected to the lever 117 mounted on the shaft 120 by a joint pin 126.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. An electric switchgear having a pull-out frame and a switching device which can be inserted into the pull-out frame, wherein the switching device comprises an actuating means for operating a contact apparatus of the switching device, said actuating means further having means for locking said actuating means, the pull-out frame being provided with a positioning drive adapted to be coupled to the switching device and having a threaded spindle for moving the switching device when the switching device is coupled to the positioning drive, the pull-out frame having a tripping means arranged thereon having a sensing means disposed adjacent said threaded spindle and adapted to be actuated by a tool provided for operating the threaded spindle, the switching device having a coupling means arranged thereon which cooperates with a tripping device, of the actuating means of the switching device and with the tripping means, said tripping means operating to move said coupling means thereby to move said tripping device to trip said switching device when said tool is inserted into said switchgear to operate said threaded spindle and contact said sensing means.

2. The switchgear recited in claim 1, further comprising latching means associated with the tripping means and adapted to be released by the positioning drive for resetting the electric switchgear.

3. The switchgear recited in claim 2, wherein the latching means comprises an unlatching slide provided for releasing the positioning drive which can be swung into a path of motion of the tripping means.

4. The switchgear recited in claim 3, wherein the latching means comprises a leaf spring having a tab disposed at an angle to the positioning direction of the tripping means, and the tripping means is provided with a projection which can be pushed over the tab.

5. The switchgear recited in claim 4, wherein the leaf spring is attached to a control lever guided by a bearing pin in an elongated hole of a bottom plate of the pull-out frame movably in the direction of travel of the switchgear and tiltably relative thereto, the control lever being coupled flexibly to a latch attached transversely to the travel direction of the switching device to a cross piece serving as an abutment for the threaded spindle, the latch having a guide pin for engagement with a gate located in the bottom plate, the control lever being coupled flexibly to an auxiliary lever having a working surface cooperating in an actuated state with the unlatching slide in the sense of providing a mutual interlock, the gate having recess means for different positions of the switching device in the pull-out frame and cam means for automatic resetting of the control lever and the unlatching slide when the switching device is moved.

6. The switchgear recited in claim 1, further comprising driver means, for actuating the tripping means adapted to a profile of an operating head of the threaded spindle and which can be engaged by the tool.

7. The switchgear recited in claim 1, wherein the tripping means comprises a tripping slide arranged parallel to the threaded spindle movable by a guide rod which is guided in a stationary cross piece serving as a nut for the threaded spindle, and further comprising a movable cross piece movable in a straight line and forming an abutment for the threaded spindle.

8. The switchgear recited in claim 7, wherein the tripping means of the pull-out frame comprises a cam which is engaged by a post of a pressure piece tiltably supported on the movable cross piece, a projection of the pressure piece engaging a working surface of an auxiliary tripping device disposed parallel to the tripping means and which is guided movably and arranged opposite the tripping means such that a shift of the tripping means is transformed into a motion of the auxiliary tripping device in a direction opposite said shift.

9. The switchgear recited in claim 8, wherein the cam comprises a slot approximately in the shape of a quarter circle.

10. The switchgear recited in claim 7, further comprising a follower slide arranged on the stationary cross piece extending with an angled-off portion over the threaded spindle and having an extension providing an abutment for a spring, the other end of which acts on the guide rod for pretensioning the tripping slide in a rest position thereof.

11. The switchgear recited in claim 10, wherein the threaded spindle has an end section free of thread, and the angled-off portion of the follower slide has an opening for the end section to pass through.

12. The switchgear recited in claim 10, further comprising a projection extending from a cross piece which is attached to the guide rod and arranged at least partially parallel to the angled-off portion of the follower slide, said cross piece having at least one opening providing an abutment for a cover of a flexible transmission means, said flexible transmission means having a core which operates the angled-off portion of the follower slide via a force which has a tendency to shift the tripping slide in the direction of tripping the switching device.

13. The switchgear recited in claim 1, wherein the couping means comprises a coupling member which cooperates with a latching member of an energy accumulator of the switching device and which is held by a sensing member and a sensing surface of the tripping means in an inoperative position with the switching device coupled to the positioning drive.

14. The switchgear recited in claim 7, wherein the coupling means comprises a longitudinally movable rod having an end region of variable width, said rod driven by a deflection drive means cooperating with the tripping means, said rod engaging in said region of variable width between a stationary guide pin and a pin arranged on a slide means which is movable in a direction toward the tripping device of the switching device.

15. The switchgear recited in claim 14, wherein the region of variable width of the longitudinally movable rod has mirror symmetry to a center line extending transversely to the longitudinal extent of the rod.

16. The switchgear recited in claim 7, wherein the longitudinally movable rod is pretensioned by a spring in the direction of shifting the slide means in the direction of opening the switching device, and is movable by a further sensing lever cooperating with the stationary cross piece against the force of the spring.

17. The switchgear recited in claim 14, further comprising two slides and two longitudinally movable rods coupled flexibly to each other for the simultaneous actuation of two tripping means of the switching device, said two longitudinally movable rods being jointly loaded with a restoring force.

18. The switchgear recited in claim 14, wherein the slide means is guided by a support which comprises an abutment for a restoring spring engaging the slide means and which has at least one through hole for fastening to the switching device.

19. The switchgear recited in claim 14, wherein said slide means is selectively manually operable.

* * * * *